US010257216B2

(12) United States Patent
Bußer et al.

(10) Patent No.: US 10,257,216 B2
(45) Date of Patent: Apr. 9, 2019

(54) METHOD AND SYSTEM FOR OBTAINING AND ANALYZING FORENSIC DATA IN A DISTRIBUTED COMPUTER INFRASTRUCTURE

(71) Applicant: Siemens Aktiengesellschaft, München (DE)

(72) Inventors: Jens-Uwe Bußer, Neubiberg (DE); Jorge Cuellar, Baierbrunn (DE); Michael Munzert, Gräfelfing (DE); Heiko Patzlaff, München (DE); Jan Stijohann, München (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 15/306,162

(22) PCT Filed: Apr. 23, 2015

(86) PCT No.: PCT/EP2015/058815
§ 371 (c)(1),
(2) Date: Oct. 24, 2016

(87) PCT Pub. No.: WO2015/193007
PCT Pub. Date: Dec. 23, 2015

(65) Prior Publication Data
US 2017/0142148 A1 May 18, 2017

(30) Foreign Application Priority Data

Jun. 16, 2014 (DE) .................. 10 2014 211 504

(51) Int. Cl.
*H04L 29/06* (2006.01)
*G06F 21/55* (2013.01)
*H04L 12/24* (2006.01)

(52) U.S. Cl.
CPC ........ *H04L 63/1433* (2013.01); *G06F 21/552* (2013.01); *H04L 41/046* (2013.01);
(Continued)

(58) Field of Classification Search
CPC . H04L 41/046–41/048; H04L 41/06–41/0627; H04L 41/20;
(Continued)

(56) References Cited

U.S. PATENT DOCUMENTS 8,209,758 B1 6/2012 Doukhvalov et al.
2003/0097617 A1 5/2003 Goeller et al.
(Continued)

FOREIGN PATENT DOCUMENTS

CN  101582788 A  11/2009

OTHER PUBLICATIONS

Chandia R. et al: Security Strategies for Scada Networks; In Critical Infrastructure Protection; Springer US, Boston MA; XP055202461; ISBN: 978-0-38-775461-1; Bd. 253; pp. 117-131; DOI: 10.1007/978-0-387-75462-8_9;2007.
(Continued)

*Primary Examiner* — Kevin Bechtel
(74) *Attorney, Agent, or Firm* — Schmeiser, Olsen & Watts LLP

(57) ABSTRACT

A system for obtaining and analyzing forensic data in a distributed computer infrastructure. The system includes a plurality of computing devices and at least one monitoring unit, which are connected to each other via a communication network. Every computing device is configured to detect security events and send same to the monitoring unit. The monitoring unit is configured to evaluate the received security events and assign same to a danger category, wherein if there is a lack of information for assigning a danger category, the computing device is configured in such a manner as to receive instructions for gathering additional forensic
(Continued)

Figure 1:
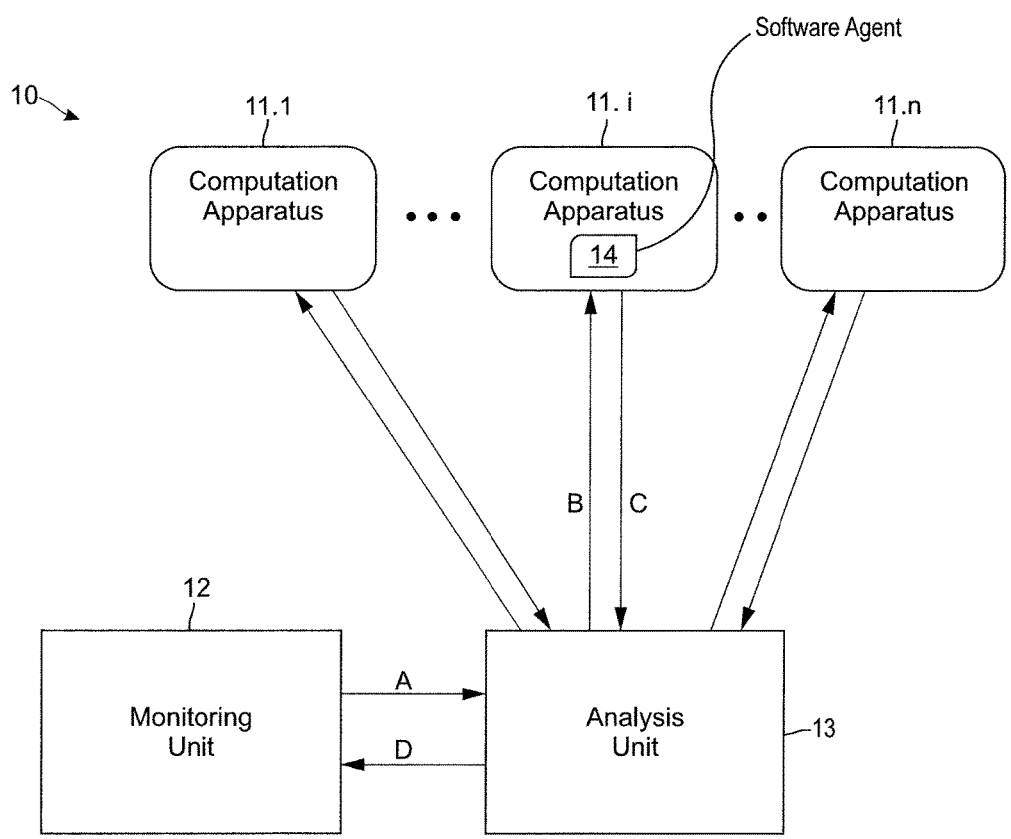

data and to send the additional data via an analysis unit to the monitoring unit. The monitoring unit is configured in such a manner as to transmit instructions to the computing device for gathering additional data and to use same for re-evaluation and assigning of a danger category.

14 Claims, 2 Drawing Sheets

(52) U.S. Cl.
CPC .......... *H04L 41/20* (2013.01); *H04L 63/1408* (2013.01); *H04L 63/1416* (2013.01); *H04L 63/1425* (2013.01); *H04L 69/04* (2013.01)

(58) Field of Classification Search
CPC ........ H04L 63/1408–63/1425; H04L 63/1433; H04L 69/04
See application file for complete search history.

(56) References Cited

U.S. PATENT DOCUMENTS

| | | |
|---|---|---|
| 2004/0054917 A1 | 3/2004 | Obrecht et al. |
| 2006/0077964 A1* | 4/2006 | Wu .................... H04L 41/0893 370/352 |
| 2007/0209074 A1 | 9/2007 | Coffman |
| 2009/0164522 A1 | 6/2009 | Fahey |
| 2009/0328222 A1 | 12/2009 | Helman et al. |
| 2012/0210427 A1 | 8/2012 | Bronner et al. |
| 2012/0260304 A1 | 10/2012 | Morris et al. |
| 2013/0144888 A1* | 6/2013 | Faith ................. G06F 17/30696 707/748 |
| 2013/0312092 A1 | 11/2013 | Parker |
| 2015/0256550 A1* | 9/2015 | Taylor .................... H04L 67/18 726/23 |

OTHER PUBLICATIONS

International Search Report for PCT Application No. PCT/EP2015/058815, dated Jul. 24, 2015.
Zhou Min et al: "Study on the Distributed Computer Forensics Model", CPEL; 1652690P; Microelectronics & Compuster, vol. 29, No. 2; Feb. 2012;; 2012;.
Non-English Chinese Office Action for Application No. 201580032396.0 dated Nov. 27, 2018.

* cited by examiner

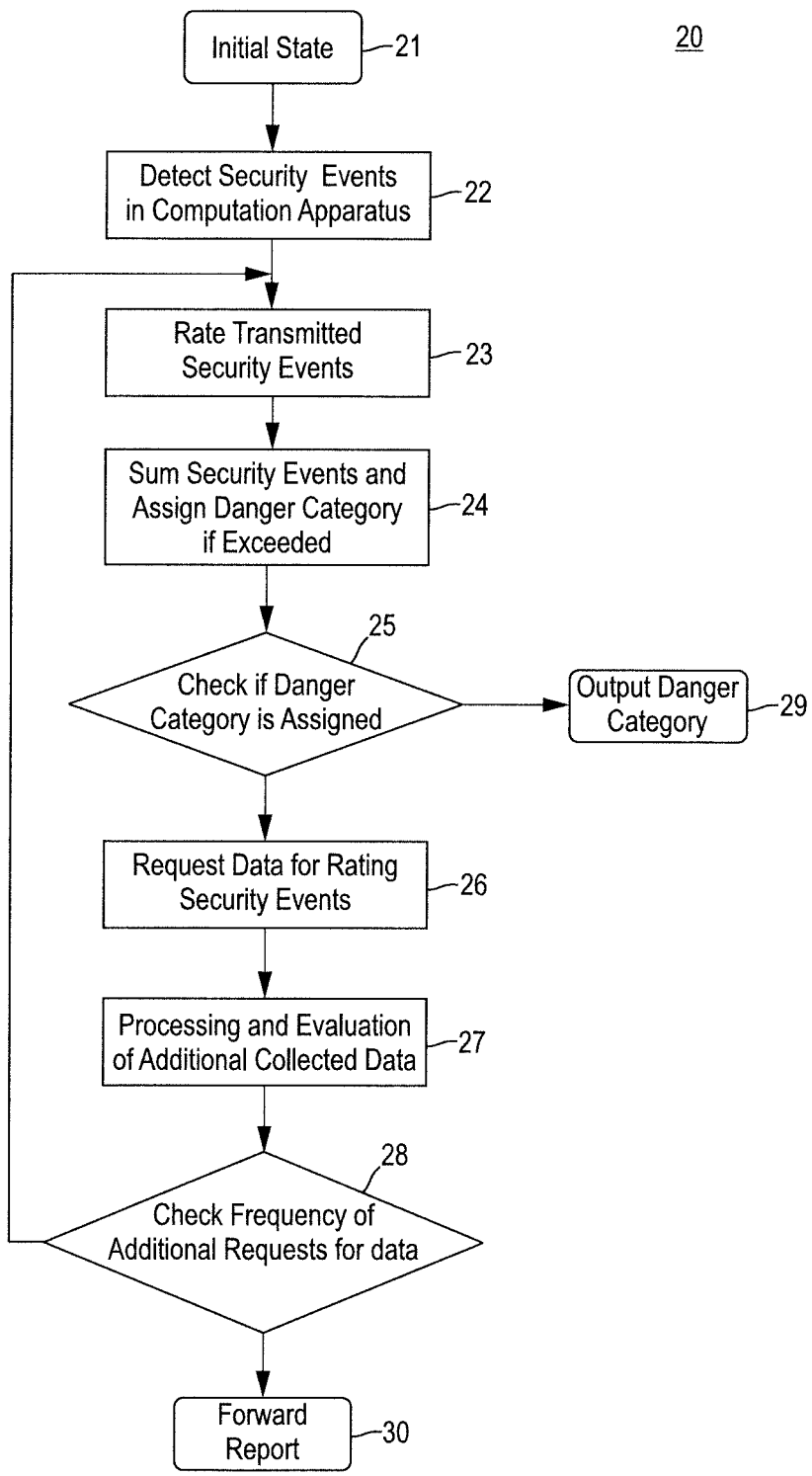

METHOD AND SYSTEM FOR OBTAINING AND ANALYZING FORENSIC DATA IN A DISTRIBUTED COMPUTER INFRASTRUCTURE

CROSS-REFERENCE TO RELATED APPLICATIONS

This application claims priority to PCT Application No. PCT/EP2015/058815, having a filing date of Apr. 23, 2015, based off of German application No. DE 102014211504.3 having a filing date of Jun. 16, 2014, the entire contents of which are hereby incorporated by reference.

FIELD OF TECHNOLOGY

The following relates to a method and an apparatus for obtaining and analyzing forensic data in a distributed computer infrastructure having multiple computation apparatuses and at least one monitoring unit, which are connected to one another via a communication network.

BACKGROUND

In industrial installations, such as automation installations for producing economic goods or installations for generating power or power distribution systems, for example, computation apparatuses, such as e.g. what are known as field devices or other control devices, are connected to one another by a communication network. This communication network is used to interchange measurement and control data between the computation apparatuses or to distribute control or administration messages from a superordinate control level to the individual computation apparatuses. Security event management and security information monitoring systems are used to centrally store and manage security protocol data that arise in distributed computer infrastructures of this kind too. Analysis of these data identifies security-relevant events and reports them to a monitoring center.

Typical examples of security-relevant events of this kind are failed registration attempts, connections by a computer to "malicious" or "suspicious" websites, network scans originating from a computation apparatus, and the like. So that a human analyst, for example personnel for installation monitoring, can react to the reported events in the right way, categorization into innocent or malicious events is necessary. Although typical security event management and security information management systems frequently implement algorithms for such categorization, an explicit association solely on the basis of the available data is not possible in many cases. In other cases, innocent events are erroneously associated as malicious or vice versa, what are known as "false positive" events or "false negative" events.

In cases in which an explicit association is not possible, time-consuming follow-up examinations, such as e.g. a manual forensic examination of the relevant computation apparatus, are necessary. These typically cannot take place in the security event and security information management system itself and sometimes require particular specialist knowledge.

If explicit association of a security-relevant event with a danger category is not possible, categorization of the security events, for example, is generally dispensed with at present, unclassifiable events, also called underreporting, are suppressed or indistinct categorization by a rating system, for example by low, medium or high relevance, is performed. Nonexplicit classification of this kind frequently arises as a result of there not being sufficient information to be able to analyze the security-relevant event more accurately.

SUMMARY

An aspect relates to improving the error rate when sorting or categorizing security events in distributed computer infrastructures.

In the system according to embodiments of the invention for obtaining and analyzing forensic data in a distributed computer infrastructure having multiple computation apparatuses and at least one monitoring unit, which are connected to one another via a communication network, each computation apparatus is designed to detect security events and to send them to the monitoring unit, and the monitoring unit is designed to evaluate the received security events and to assign them to a danger category, wherein when there is insufficient information for assigning a danger category, the computation apparatus is designed to receive instructions for collecting additional forensic data and to send the additional data to the monitoring unit. The monitoring unit is designed to transmit instructions for collecting additional data to the computation apparatus and, following reception of the evaluated additional data, to use said data for fresh rating and assignment of a danger category.

This has the advantage that additional forensic data are now ascertained in the computation apparatus and made available to the monitoring unit. These additional forensic data can be used to perform fresh evaluation and categorization. The error rate for the categorization of the security events is substantially reduced in this case.

In one advantageous development, the system according to embodiments of the invention comprises an analysis unit that evaluates the additional, collected data.

This has the advantage that the obtainment and at least the prior evaluation of the additional, collected data to proceed independently of an already existent system. Only slight adjustments need to be made. Although the monitoring unit receives additional data, it is able to rate said data in a familiar manner and to use them for assigning a danger category. This analysis unit may be in the form of a standalone unit or in the form of a functional unit in the monitoring unit, and can therefore be integrated flexibly into existing systems.

In one advantageous development, the analysis unit is designed to transmit a software agent to the computation apparatus, the software agent being designed to ascertain additional forensic data in the computation apparatus and to send said data to the analysis unit.

This has the advantage that the computation apparatuses do not have to provide apparatuses or units of their own for collecting additional data. Conventional computation apparatuses that are already in use can be monitored in the system according to embodiments of the invention in an improved manner. An expensive upgrade for computation apparatuses with a component for collecting additional data is not necessary. The computation apparatuses are loaded only temporarily by the software agent.

In one advantageous development of the system according to embodiments of the invention, the software agent takes the type of the security events rated in the monitoring unit as a basis for collecting different additional data in the computation apparatus.

This has the advantage that particularly relevant additional data are collected in a manner specific to the type of the security event rated in the monitoring unit. By way of example, in the case of a single or in the case of repeatedly failed login attempt(s), information about the address or the whereabouts of the component that has initiated the login attempts can be determined.

In one advantageous refinement of the system according to embodiments of the invention, the monitoring unit is designed to perform rating of an individual security event by assigning a weighting factor on the basis of the relevance of the security event.

Hence, an appraisal of a security event is performed in respect of the relevance of the reported security event. It is therefore possible to distinguish between the individual reported security events to a greater extent.

In one variant embodiment, the monitoring unit is designed to assign a particular danger category to one or more security events if the sum of the weighting factors of the individual security events exceeds a prescribed threshold value.

The rating of multiple security events prompts a well-founded appraisal, and erroneous appraisals on account of sporadically occurring security events can be reduced.

In one advantageous embodiment, the software agent is designed to collect metadata from files and/or entries in a register for configuration data and/or protocol entries from an antivirus program in the computation apparatus as additional data.

Said data contain a multiplicity of pieces of information, such as storage date or storage time, size of the file, type of the file and indications about compromise of the computation apparatus by viruses, etc., which allow a more accurate appraisal of a security event.

In one advantageous embodiment, the software agent transmits the additional data to the analysis unit in compressed form.

This reduces the necessary bandwidth for transmitting the additionally requested or additionally delivered data and therefore loads the communication network only slightly.

The method according to embodiments of the invention for obtaining and analyzing forensic data in a distributed computer infrastructure having multiple computation apparatuses and at least one monitoring unit, which are connected to one another via a communication network, has the method steps cited below. The first method step is detection of security events in the computation apparatus and transmission of the security events to the monitoring unit. This is followed by the method steps of rating of the individual security events and assignment of a danger category in the monitoring unit. If the available information or the existing security events is/are not sufficient to assign a danger category, data are additionally requested from the computation apparatus. The additionally collected data are evaluated on the basis of security-oriented aspects, and the evaluated data are transmitted to the monitoring unit. There, the security events and the evaluated additional data are rated afresh and a danger category is assigned.

Hence, in cases in which explicit association of a danger category is not possible, further security-relevant data are automatically collected in the relevant computation apparatus or other relevant computation apparatuses and are further evaluated and used for rating and categorization. Hence, the number of erroneous associations of danger categories can be reduced and manipulation of the distributed computation infrastructure such as e.g. an industrial application can be identified.

In one advantageous variant of the method according to embodiments of the invention, an individual security event is rated by assigning a weighting factor on the basis of the relevance of the security event.

In a further variant, one or more security events is/are assigned a particular danger category if the sum of the weighting factors of the individual security events exceeds a prescribed threshold value.

Hence, the appraisal and categorization of security events is rated differently in respect of relevance and as far as possible is based on multiple security events. This reduces erroneous appraisal of the security events.

In one advantageous embodiment of the method, one or more security events is/are assigned a particular danger category if additionally prescribed conditions are satisfied.

This means that it is possible to test additional constraints that are important for appraisal of the security events. This also ensures that the available resources, such as the bandwidth of the communication network or the processor power of the individual computation apparatuses or of the monitoring unit, for example, are used effectively and are not overloaded.

In one advantageous embodiment of the method according to embodiments of the invention, different additional data are collected in the computation apparatus on the basis of the type of the security events rated in the monitoring unit.

This means that it is possible to limit the type of the data to be additionally collected in the computation apparatus to such data as have the greatest relevance for the rated security event. Hence, the necessary bandwidth for transmitting the additional data is reduced and the processor power in the analysis unit is reduced. This means that an analysis can be performed more quickly and more effectively.

In one advantageous embodiment, the additionally collected data are transmitted in compressed form.

This also has the advantage of loading normal operation of the distributed infrastructure and particularly of the communication network as little as possible.

Furthermore, a computer program product having program commands for performing the method described is claimed.

BRIEF DESCRIPTION

Some of the embodiments will be described in detail, with reference to the following figures, wherein like designations denote like members, wherein:

FIG. 1 shows an exemplary embodiment of a system for obtaining and analyzing additional forensic data in a distributed computer infrastructure; and FIG. 2 shows an exemplary embodiment of the method presented in the form of a flowchart.

Parts that correspond to one another are provided with the same reference symbols throughout the figures.

DETAILED DESCRIPTION

FIG. 1 shows a schematic representation of an exemplary embodiment of a system according to embodiments of the invention in which computation apparatuses 11.1, . . . , 11.i, . . . , 11.n and also a monitoring unit 12 and an analysis unit 13 are connected to one another by a communication network, which is not represented. By way of example, the computation apparatuses 11.1, . . . , 11.i, . . . , 11.n may be individual field devices in an automation installation or components of a power distribution installation or of another industrial installation. The monitoring unit 12 is designed to store security events that have been detected in each of the computation apparatuses 11.1, . . . , 11.n and have been sent to the monitoring unit 12, to manage them and to identify and report security-critical events by means of an analysis of the security events.

Typical examples of security events are failed registration attempts, connections by a computer to malicious or suspicious websites or else network scans originating from a computation apparatus.

Since the rating of one or more security events occurring in the monitoring unit is often not sufficient to identify a security-critical event or to assign a danger category to this event, the monitoring unit 12 is designed to send, if there is insufficient information for assigning a danger category, an instruction to the computation apparatus, for example computation apparatus 11.$i$, that requests the collection of additional forensic data. To this end, the monitoring unit 12 sends a request message A, for example via an analysis unit 13. By way of example, the request message A can comprise parameters that indicate the type or multiple types of data that are intended to be collected on the basis of the previous detected and rated security events for further rating of the security event.

The analysis unit 13 then transmits an appropriate software agent 14 in a message B to one or more computation apparatuses 11.$i$. The software agent 14 is installed and activated in the computation apparatus(es) 11.$i$, so that said software agent automatically collects the desired data in the computation apparatus 11.$i$. In this case, the software agent 14 can implement further parameters or secondary conditions, for example to collect the requested data over a predetermined period, or to collect data of a prescribed type or of multiple prescribed types, such as metadata from files and/or entries in a register for configuration data and/or protocol entries from an antivirus program, for example, in the computation apparatus 11.$i$.

The additional data collected by the software agent 14 are then sent to the analysis unit 13 in one or more transmissions C. In this case, the collected data can be compressed by the software agent 14, so that the bandwidth for transmitting these additionally collected data is reduced.

In the analysis unit 13, these additionally collected data are processed and optionally pre-evaluated. Subsequently, the processed data are sent to the monitoring unit 12 in the transmission D. Said monitoring unit performs fresh rating of the individual security events by taking into consideration the additionally collected data or the processed collected data. By way of example, the security events and the processed additionally collected data are rated by assigning a weighting factor on the basis of their relevance. If the sum of the weighting factors of the individual security events and the additionally collected data exceeds a prescribed threshold value, then they are assigned a particular danger category. This danger category is then reported to an operating unit or directly by a signal to operating personnel, for example. These can take the type of the danger category as a basis for taking further measures, such as performing a further analysis, disabling particular network gateways, etc., for example.

The use of additional collected data for categorizing the security event allows the quality of the categorization to be increased substantially. This minimizes follow-up efforts, such as a manual examination, for example, or reduces security deficits as a result of false negative categorization.

The use of a software agent 14 allows additional data to be collected in a computation apparatus 11.$i$ without the computation apparatus 11.$i$ itself providing this functionality. It is therefore possible for data to be collected even in inhomogeneously distributed computer infrastructures that comprise computation apparatuses with a wide variety of functionality.

The analysis unit 13 may, as represented in FIG. 1, be in the form of a standalone component. It may alternatively be in the form of an integrated functionality, for example in a monitoring unit 12. The analysis unit 13 processes the collected data transmitted by the software agent 14 in an automated fashion and filters out the data that are relevant for a particular security event, for example, or produces resultant additional security events therefrom.

Optionally, additional data can again be requested from the computation apparatus 11.$i$ or from other computation apparatuses that are connected to the already detected security event, for the purpose of collecting further data. This is then effected using the messages already described. The forensic data collection and analysis is therefore effected automatically. The additionally evaluated collected data are integrated into the rating and categorization of the security events in the monitoring unit 12 and are made available to a human analyst, for example by an output unit, for example by displaying an error message and/or an overview of the ascertained security events. This significantly speeds up the handling of a security incident, in comparison with a manual approach, and relieves the load on the human analyst.

FIG. 2 shows the individual method steps of the method according to embodiments of the invention in a flowchart 20.

In the initial state 21, a distributed computer infrastructure is available in which each individual computation apparatus progressively logs predetermined types of events when they occur. If one or more security events are detected in a computation apparatus 11.$i$ in method step 22, they are transmitted to the monitoring unit 12. In method step 23, the individual transmitted security events are rated in the monitoring unit 12 by assigning each security event a weighting factor in accordance with relevance from a security-oriented point of view. In method step 24, one or more rated, that is to say weighted, security events are then considered together. By way of example, all the weighting factors of the security events considered are summed. If a prescribed threshold value is exceeded, then a particular danger category is assigned. Assignment of a danger category may require further conditions to be satisfied as necessarily satisfied.

In method step 25, a check is performed to determine whether a danger category has been able to be assigned. If this is the case, then the danger category is output or reported in step 29. This completes the analysis of a conspicuous situation that arises as a result of a compromise of individual or all components of the distributed computer infrastructure 11.1, ..., 11.$i$, ..., 11.$n$, for example.

If it is established in method step 25 that either the threshold value for assignment of a danger category has not yet been reached or additional conditions for assignment of a danger category have not yet been satisfied, then additional data for rating the individual security events are requested 26. As one option, this can be requested from the one computation apparatus 11.$i$ that has detected and reported relevant security events. Alternatively, further computation apparatuses 11.1, ..., 11.$i$, ..., 11.$n$ can be asked to collect additional data, for example specific data that are related to a particular danger category, and to transmit them for evaluation to an analysis unit 13 and on to the monitoring unit 12. First processing and evaluation of the additionally collected data takes place in the analysis unit 13 in method step 27.

In the method step 28, a check is performed to determine how frequently an additional request for additional data has already been made. If a maximum number has not yet been exceeded, then the resultant data are sent to the monitoring unit 12, which rates the additionally collected data either alone or once again with the already rated individual security events in method step 23, and makes an assignment of a danger category in step 24.

If it is still not possible to assign a danger category after the maximum value prescribed in method step 28 has been exceeded, then no further request for additional data is produced and an appropriate report is forwarded in method step 30, e.g. to analysis personnel or an appropriate output unit, and the sequence is terminated.

All the features described and/or shown can be combined with one another advantageously within the context of the invention. The invention is not limited to the exemplary embodiments described.

The invention claimed is:

1. A system for obtaining and analyzing forensic data in a distributed computer infrastructure, said system comprising:
   multiple computation devices;
   at least one monitoring unit;
   at least one analysis unit; and
   an operating unit;
   wherein said computation devices are connected to one another via a communication network, and each computation device is configured to detect security events and to send them to the monitoring unit, and the monitoring unit is configured to rate the received security events and to assign them a danger category,
   wherein when there is insufficient information for assigning a danger category, each computation device is configured to receive instructions for collecting additional forensic data for rating the security event and to send the collected, additional data to the monitoring unit, and the monitoring unit is configured to transmit instructions for collecting additional data to the computation device, and, following reception of the collected, additional data, to evaluate said data and to use them for fresh rating and assignment of a danger category,
   wherein the analysis unit is configured to transmit a software agent to the computation device for installation and activation on the computation device, and wherein the software agent is configured to ascertain additional data in the computation device and to send them to the analysis unit,
   wherein the analysis unit processes the additional data and sends the processed additional data to the monitoring unit,
   wherein the monitoring unit again rates the security events by assigning a weighting factor to the security events and the processed additional data and by assigning a danger category if the sum of the weighting factors exceeds a threshold value, and the monitoring unit reports the danger category to the operating unit, and
   wherein the operating unit takes an action based on the reported danger category.

2. The system as claimed in claim 1, wherein the action taken by the operating unit comprises disabling a network gateway.

3. The system as claimed in claim 1, wherein the software agent is configured to take the type of the security events rated in the monitoring unit as a basis for collecting different additional data in the computation device.

4. The system as claimed in claim 3, wherein the software agent is designed to collect metadata from files and/or entries in a register for configuration data and/or protocol entries from an antivirus program in the computation device as additional data.

5. The system as claimed in claim 3, wherein the software agent transmits the additional data to the analysis unit in compressed form.

6. The system as claimed in claim 1, wherein the monitoring unit is designed to perform rating of an individual security event by assigning a weighting factor on the basis of the relevance of the security event.

7. The system as claimed in claim 6, wherein the monitoring unit is designed to assign a particular danger category to one or more security events if the sum of the weighting factors of the individual security events exceeds a prescribed threshold value and predetermined conditions are satisfied.

8. A method for a distributed computer infrastructure having an operating unit, multiple computation devices and at least one monitoring unit, which are connected to one another via a communication network, said communication network have network gateways, the method comprising the steps of:
   detecting, by each computation device, security events in the computation device;
   transmitting the security events to the monitoring unit;
   rating, by the monitoring unit, the individual security events;
   assigning a danger category in the monitoring unit, wherein when there is insufficient information for assigning a danger category, additional data relevant to the security event are requested from at least one computation device;
   transmitting, to the monitoring unit, the additional data to be evaluated on the basis of security-oriented aspects, wherein the security events and the evaluated additional data are again rated by assigning a weighting factor, and a danger category is assigned if the sum of the weighting factors exceed a threshold value, wherein a software agent that ascertains the additional data in the computation device and sends them to the monitoring unit is transmitted to the computation device and installed and activated on the computation device;
   reporting the danger category to the operating unit; and
   disabling, by the operating unit, particular network gateways based upon the danger category.

9. The method as claimed in claim 8, wherein an individual security event is rated by assigning a weighting factor on the basis of the relevance of the security event.

10. The method as claimed in claim 8, wherein one or more security events is/are assigned a particular danger category if additionally prescribed conditions are satisfied.

11. The method as claimed in claim 8, wherein different additional data are collected in the computation device on the basis of the type of the security events rated in the monitoring unit.

12. The method as claimed in claim 8, wherein the additional collected data are transmitted in compressed form.

13. The method of claim 8, wherein the method is implemented by a computer readable program code having program commands, wherein the computer readable program code having program commands is stored on a computer program product comprising a non-transitory computer readable hardware storage device.

14. A system in a distributed computer infrastructure, said system comprising:

multiple computation devices;
at least one monitoring unit;
at least one analysis unit; and
an operating unit for disabling network gateways;
wherein said computation devices are connected to one another via a communication network, and each computation device is configured to detect security events and to send them to the monitoring unit, and the monitoring unit is configured to rate the received security events and to assign them a danger category,
wherein when there is insufficient information for assigning a danger category, each computation device is configured to receive instructions for collecting additional forensic data for rating the security event and to send the collected, additional data to the monitoring unit, and the monitoring unit is configured to transmit instructions for collecting additional data to the computation device, and, following reception of the collected, additional data, to evaluate said data on the basis of security-oriented aspects and to use them for fresh rating and assignment of a danger category,
wherein the analysis unit is configured to transmit a software agent to the computation device for installation and activation on the computation device, and wherein the software agent is configured to ascertain additional data in the computation device and to send them to the analysis unit,
wherein the analysis unit processes the additional data and sends the processed additional data to the monitoring unit,
wherein the monitoring unit again rates the security events by assigning a weighting factor to the security events and the processed additional data and by assigning a danger category if the sum of the weighting factors exceeds a threshold value, and the monitoring unit reports the danger category to the operating unit, and
wherein the operating unit disables particular network gateways of the network gateways based upon the reported danger category.

* * * * *